United States Patent [19]

Eichenbaum

[11] 4,363,827
[45] Dec. 14, 1982

[54] MANUFACTURE OF CONCENTRIC COATINGS FOR FIBER WAVEGUIDES

[75] Inventor: Bernard R. Eichenbaum, Lilburn, Ga.

[73] Assignee: Bell Telephone Laboratories, Incorporated, Murray Hill, N.J.

[21] Appl. No.: 237,537

[22] Filed: Feb. 23, 1981

[51] Int. Cl.$^3$ .................... C02B 5/14; B05D 5/06; B05D 1/18
[52] U.S. Cl. .................................. 427/8; 65/3.11; 65/29; 427/10; 427/163
[58] Field of Search ...................... 427/8, 10, 163; 65/3.11, 29

[56] References Cited

U.S. PATENT DOCUMENTS

| | | | |
|---|---|---|---|
| 4,042,723 | 8/1977 | Presby | 427/8 |
| 4,067,651 | 1/1978 | Watkins | 356/103 |
| 4,124,728 | 11/1978 | Marcuse et al. | 427/8 |

OTHER PUBLICATIONS

Eichenbaum, "Laser-Aided Alignment of Coating Dies on Fiber Drawing Lines: Theory and Practice", Abstract TVBB4, Cleus/ICF '80, Feb. 26-28, 1980.
Applied Optics, vol. 16, No. 9, Sep. 1977, pp. 2383-2390.
The Bell System Technical Journal, vol. 55, No. 10, Dec. 1976, pp. 1525-1537.
The Bell System Technical Journal, vol. 59, No. 3, Mar. 1980, pp. 313-332.

*Primary Examiner*—James R. Hoffman
*Attorney, Agent, or Firm*—Peter V. D. Wilde; James H. Fox

[57] ABSTRACT

The forward scattering pattern from a transversely-illuminated polymer-coated optical fiber can be used to insure well-centered coatings on optical fibers. A simple interpretation of the scattering pattern provides an error signal to guide compensatory coating cup alignment. For polymers coating materials with a refractive index higher than that of silica, the scattering pattern contains caustic surfaces. If the coating is eccentric in a direction perpendicular to the incident rays, the positions of the caustic surfaces vary monotonically with eccentricity.

5 Claims, 9 Drawing Figures

A

B

MANUFACTURE OF CONCENTRIC COATINGS FOR FIBER WAVEGUIDES

BACKGROUND OF THE INVENTION

The goal of placing an axially-symmetric coating around an optical fiber has been experimentally approached through various techniques and theoretically analyzed with various models. There is ample reason for this interest. Good centering has been shown to increase fiber strength. It also eases the fabrication of connector arrays for splicing and provides maximum abrasion protection for a given coating. Furthermore, an asymmetric coating may add to fiber loss.

BRIEF STATEMENT OF THE INVENTION

For a coating that is fairly transparent and has a refractive index more than that of the fiber cladding, a light beam incident essentially transverse to the optic axis has been found to have a notably characteristic forward scattering pattern. Its shape and position are easily monitored and provide unambiguous information about both coating thickness and eccentricity for any degree of eccentricity. The backscatter pattern has been previously analyzed and used as an in-line centering monitor. (See, for example, *The Bell System Technical Journal,* 55, No. 10 (December 1976), pp. 1525-1537, and *Applied Optics,* 16 (1977), page 2383).

DETAILED DESCRIPTION

Figure 1:
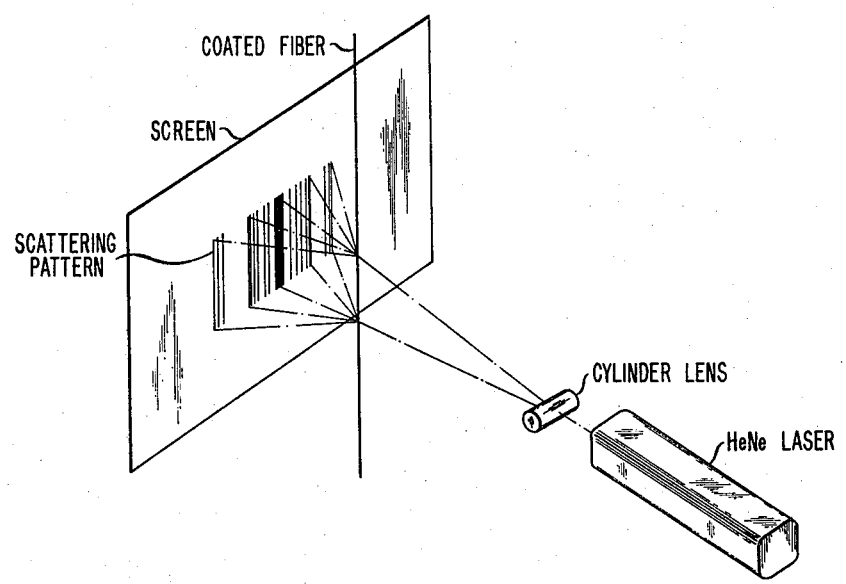
FIG. 1 is a schematic view of a setup used for generating the forward scattering pattern of a coated fiber.
Figure 2:
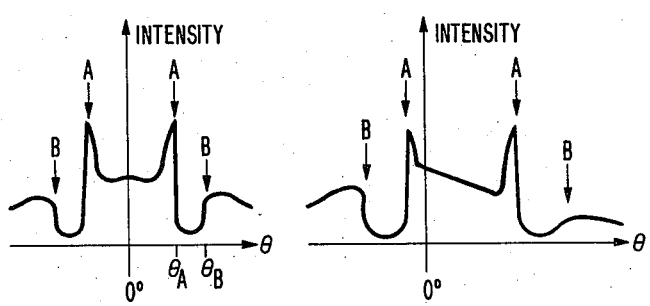
FIG. 2 is a plot of the envelope of the characteristic scattering pattern intensities for (a) centered and (b) eccentric coatings.
Figure 2:
Figure 2:
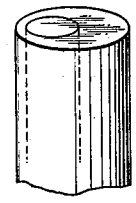

Under appropriate values of coating refractive index, thickness, and eccentricity, an optical fiber illuminated as in FIG. 1 generates the scattering pattern shown in FIG. 2. We wish to predict the scattering angles $\theta_A$ and $\theta_B$ associated with the A and B boundaries between light and dark zones. Of special interest are the locations of the A boundaries. Their clear delineations enhance their potential as reference points for automated derivation of error signals.

Since our interest is primarily to predict the angles $\theta_A$ and $\theta_B$, we focus on the power envelope of the scattering pattern (as opposed to individual fringes). This approach allows a variety of simplifications and the model thereby obtained can be characterized by the following list of assumptions:

1. Ignore phase and polarization of scattered radiation.
2. Assume both fiber and coating to be cylindrical, though not necessarily concentric.
3. Allow eccentricities only transverse to the incident rays.
4. Ignore Fresnel reflections.
5. Assume lossless dielectrics.
6. Assume n=1.457 at 633 nm throughout cladding and core (ignore core profile).
7. Assume incident rays are all parallel and of uniform intensity.

As we shall see later, the model's predictions of $\theta_A$ and $\theta_B$ agree closely with the experiment. However, to appreciate its realm of applicability, some point-by-point justifying comments are helpful.

(1) Using the technique described here, phase and polarization information in the scattered radiation and the pattern of the interference fringes is irrelevant. Our concern is merely the power envelope of the pattern. Use of the pattern of interference fringes is described in U.S. Pat. No. 4,067,651, issued Jan. 10, 1978 to L. S. Watkins.

(2) In the great majority of the coated fibers, both coating and fiber are nearly circular cylinders.

(3) While allowing only transverse eccentricity does restrict the applicability of the results, this is not troublesome from an instrumentation point of view. The in-line monitoring equipment is always an orthogonal cross-beam set-up so that aligning for symmetry on one axis assures only transverse eccentricity on the other.

(4) Except for relatively few rays (near total internal reflection conditions), the Fresnel reflections carry too little power to materially alter the high irradiance gradient observed at the boundaries, particularly the A-boundaries.

(5) By reasoning similar to (iv), a small transmission loss through one pass of the coating can be ignored.

(6) Rays passing through the fiber core all lie within the bright central region of the scattering pattern and do not affect the contrast at A or B.

(7) Lastly, the incident HeNe laser beam provides a reasonably plane and uniform intensity source over the <0.3-mm outside diameter of the coating.

The model is embodied in a ray-tracing Fortran computer program, VSCATE. Each ray is identified by its normalized height H, the height of the ray above the coating's center expressed as a fraction of the coating radius $r_1$ (see FIG. 3). After tracing the ray, we find it exits the coating at some angle, $\theta$, relative to the incident direction. From the discrete pairs of values ($\theta$, H), we can approximate $d\theta(H)/dH$. The uniform incident radiation assumption then allows us to state $$P(\theta) \propto \Sigma |d\theta(H)/dH|^{-1}, \qquad (1)$$

where $P(\theta)$ is the power scattered per unit angle at $\theta$. The summation is required because more than one H may correspond to a particular $\theta$. For tracing rays incident below the coating's center (H<0), we appeal to the symmetry $$\theta(H, E) = -\theta(-H, -E), \qquad (2)$$

where E is the signed eccentricity of the coating. The divergence of Equation (1) when $d\theta/dH = 0$ is a consequence of ignoring diffraction effects and is related to assumption number one of the model. The integrated scattered power does not diverge, whether or not diffraction is included.

Figure 3:
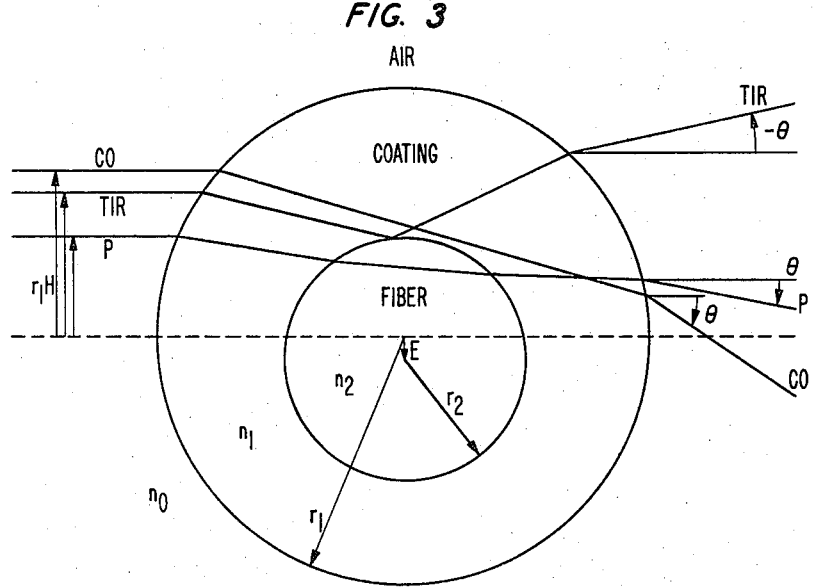
FIG. 3 is a diagram showing the three characteristic types of rays used to generate the caustic ray pattern.
Figure 6:
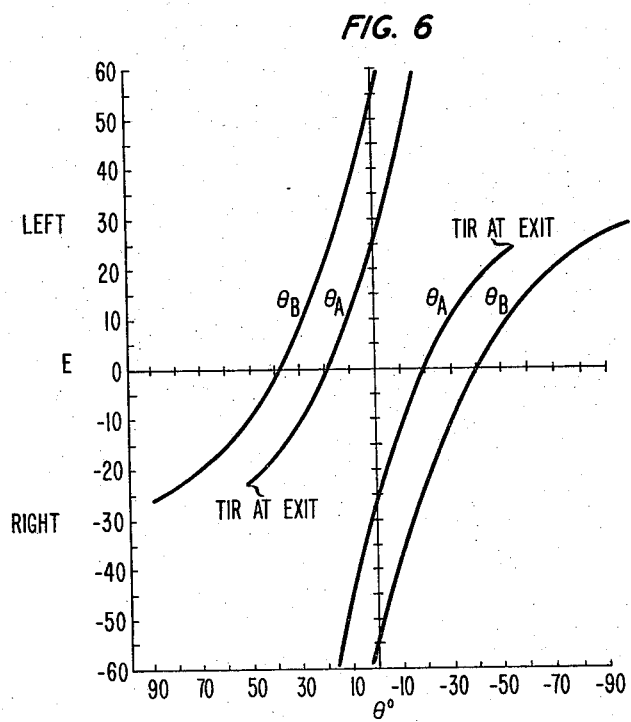
FIG. 6 shows plots of $\theta_A$ and $\theta_B$ on both sides of the scattering pattern as they would appear to an observer as the FIG. 3 fiber coating became eccentric to the left (up) and to the right (down)

In FIG. 3, we have a cross section of a coated fiber with three rays traversing it, showing the sign conventions for H, E, and $\theta$, and the three characteristic paths a ray may take once it enters the coating: (1) passes through the coating and penetrates (P) the fiber, (2) experiences a total internal reflection (TIR) at the coating-fiber interface, and (3) traverses the coating only (CO) and does not intercept the fiber. (Actually, a fourth possible path exists for sufficiently eccentric coatings wherein a TIR occurs as the ray tries to exit the coating. This case is of significance only for large eccentricities as will be seen in FIG. 6.) The three rays illustrated were calculated by the VSCATE ray trace program with $n_0 = 1.0003$, $n_1 = 1.539$, and $n_2 = 1.457$, appropriate for a coating with a refractive index of 1.539 on a solid 100-percent silica fiber, surrounded by air.

Ray paths are uniquely determined by the H-value, refractive indices, and cross-section geometry. An equation representing each straight-line segment is obtained by appropriate application of either Snell's Law or a TIR at each preceding boundary. A simultaneous solution of this equation and the next boundary locus provides the next boundary intersection, whereupon the process repeats. Finally, as the ray exits the coating, its overall deviation $\theta$ from its original direction is related to the original H.

For the concentric coating case, $\theta(H)$ can be obtained in closed form by application of Bouguer's formula without a ray trace. A Fortran program, SCATCF, was written to evaluate the scattering pattern predicted by the closed form expressions. Although applicable only to the concentric case, it is valuable when compared to the more general ray trace approach as a check for mutual consistency between the models. Excellent agreement was found. For example, FIGS. 7 and 8 can be obtained identically from either VSCATE or SCATCF. Table I summarizes the conditions for the existence of the various rays used in the analysis and the values of H corresponding to each type.

Figure 4:
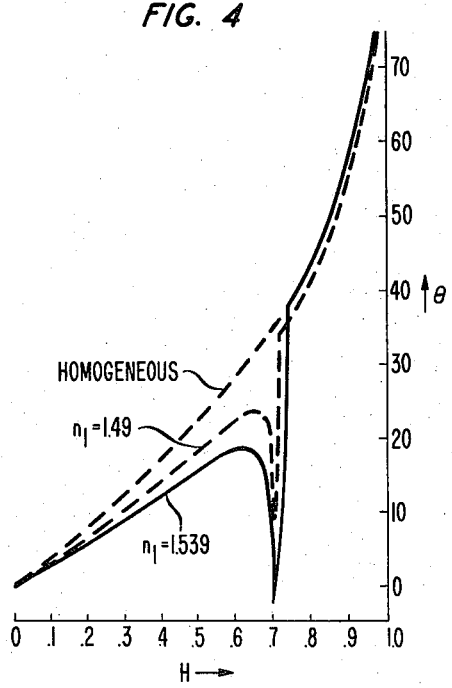
FIG. 4 is a plot of $\theta$ vs. H for three fibers with different refractive index profiles.

Plots of $\theta(H)$ are perhaps the clearest way to appreciate the origin of the light and dark zones. The solid line in FIG. 4 plots $\theta(H)$ for a fiber with a cured concentric $n = 1.539$ coating with $r_1 = 114.3$ $\mu m$ and $r_2 = 55.0$ $\mu m$. The assumed refractive index values are the same as those assumed in drawing the FIG. 3 rays. Upon comparing this result to the scattering of a homogeneous cylinder of $n = 1.539$ coating of 114.3-$\mu m$ radius (long-dashed line), we note the following: (1) The two plots differ most dramatically at $H = n_2 r_2 / n_0 r_1$ ($\sim 0.70$). It is at this H-value where the silica cylinder is acting most strongly as a negative lens; ray refractions or TIRs at the fiber-coating boundary are most strongly counteracting the ray refractions at the coating-air boundary. Also, at this H, the transition from P to TIR rays occurs. (2) The zero value of $d\theta/dH$ at $H \sim 0.62$ implies the formulation of a caustic surface at the corresponding angle, 18.45 degrees. The bright caustic surface is represented by the peaks in FIG. 2. (3) At slightly greater scattering angles, light comes from rays originating at $H \sim 0.73$, where $d\theta/dH$ is relatively large, implying a low $P(\theta)$. We therefore predict a high contrast between a bright inner zone (ending at 18.45 degrees) and the angles immdiately beyond, just as observed at boundary A. Starting at $H = n_1 r_2 / n_0 r_1$ (0.74), corresponding to $\theta \simeq 38$ degrees, the rays miss the fiber and traverse only the coating. As it should, the plot thereafter coincides with the coating-only case. Also, the sudden decrease in $d\theta/dH$ occurring at 38 degrees predicts boundary B, the start of the outer bright zone.

TABLE I

| Types of Rays Present | Conditions for the presence of the various ray types Conditions on $n_0$, $n_1$, $n_2$, $r_1$, $r_2$ When $E = 0$ |
|---|---|
| P | $n_2 r_2 / n_0 r_1 > 1$ |
| P and TIR | $n_2 r_2 / n_0 r_1 < 1$ and $n_1 r_2 / n_0 r_1 > 1$ |
| P, TIR, and CO | $n_1 r_2 / n_0 r_1 < 1$ |

We see in FIG. 4 how a change in coating refractive index to 1.49 changes $\theta(H)$ (short dashed line). The key difference is that the broad peak has narrowed, indicating a decrease in illuminance at the edge of the bright zone. The CO rays do not superimpose on the $n = 1.539$ homogeneous cylinder, since the refractive power is less for the lower index.

Figure 5:
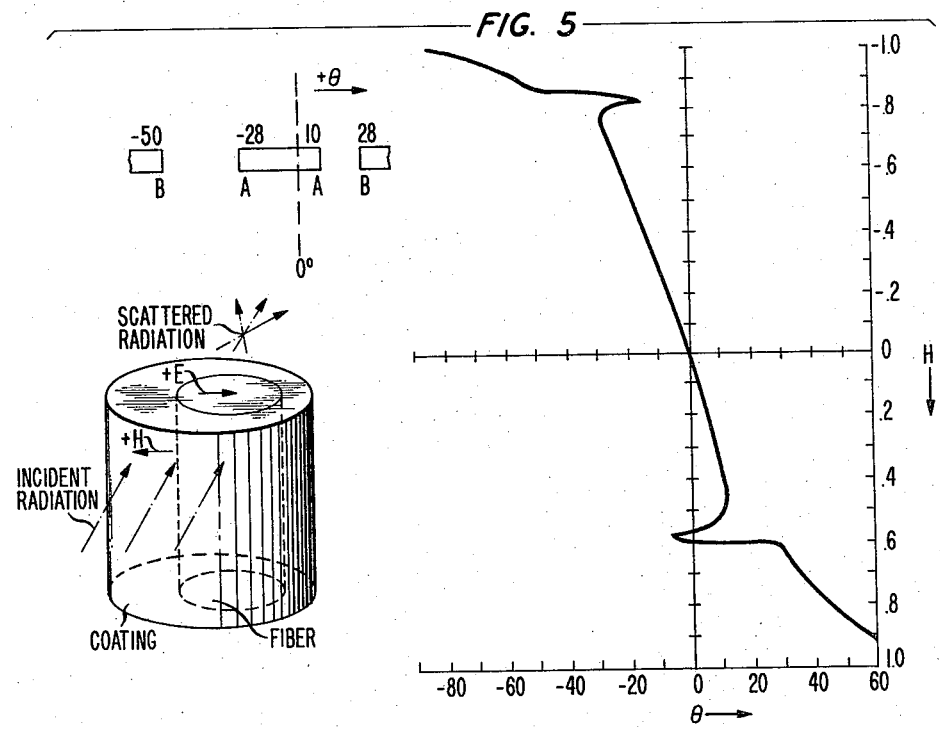
FIG. 5 is a plot of $\theta$ vs. H for one of the cases of FIG. 4 with the spatial relationship among E, H and $\theta$ shown in the inset.

FIG. 5 indicates how an eccentricity changes the pattern. With dimensions unaltered from FIG. 4, an eccentricity of 10 $\mu m$ transverse to the incident rays is introduced. We see that the scattering pattern is now asymmetric about $H = 0$ and its orientation relative to the eccentricity is shown in the drawing.

By evaluating a variety of eccentricities, the sensitivity of the scattering pattern to the transverse offset can be ascertained. $\theta_A$ and $\theta_B$ are plotted against eccentricity in FIG. 6 for left and right sides of the scattering pattern. We see that, for $n_1 = 1.539$ and $r_2/r_1 = 0.4812$, one set of $\theta_A$ and $\theta_B$ boundaries disappears at $E = \pm 22.4$ and $\pm 26.2$ $\mu m$, respectively, while the other set moves toward the center and remains visible even when the fiber reaches the maximum possible eccentricity. The $\theta_A$ disappearance is a result of the previously mentioned TIRs, which can occur as the ray attempts to exit the coating while the $\theta_B$ limit is a manifestation of the maximum refracting power of the coating. Error signals for an automated system should be obtainable from the nondisappearing $\theta_A$ for all eccentricities. The computed slopes of the FIG. 6 curves at $E = 0$ show a small-eccentricity sensitivity of 0.85 degrees/$\mu m$ for the two $\theta_A$'s and 1.1 degrees/$\mu m$ for the two $\theta_B$'s.

Figure 7:
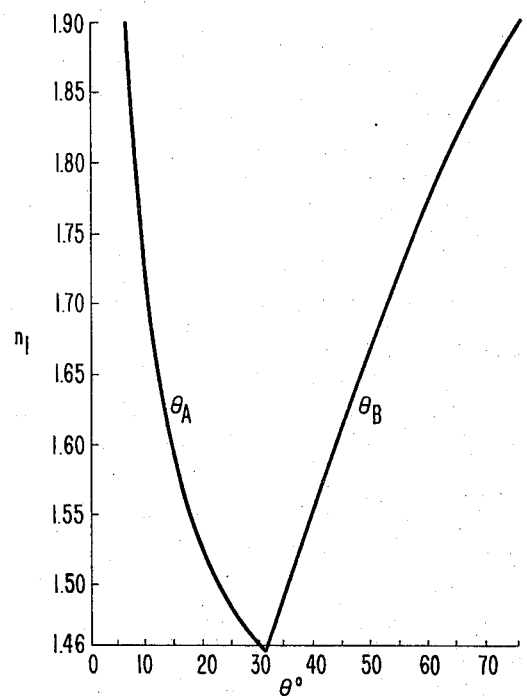
FIG. 7 is a plot of $\theta$ vs. refractive index of the coating.
Figure 8:
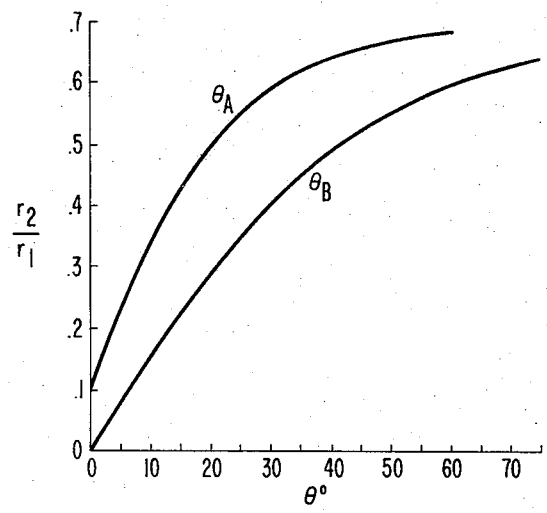
FIG. 8 is a plot of $\theta$ vs. the ratio of the diameter of the fiber to the overall diameter of the coated fiber.

The angle separating $\theta_B$ from $\theta_A$ varies with $n_1$ as other parameters are held constant. FIG. 7 illustrates this with plots of $\theta_A$ and $\theta_B$ as functions of $n_1$. $\theta_A$ and $\theta_B$ also vary significantly with the ratio $r_2/r_1$, as shown in FIG. 8. This dependency can conceivably be used for monitoring coating thickness in-line, given the fiber diameter. Instrumentation for this would be more complex than that used for merely monitoring eccentricity. Notice that the $\theta_A$ caustic disappears when $r_2/r_1$ is below a certain value ($\sim 0.10$ in FIG. 8). When $r_2/r_1$ is sufficiently small, the negative lensing at the coating-fiber interface is more powerful than the positive lensing of the air-coating interface, even for paraxial rays ($|H| << 1$). That is, the condition that the converging wavefront formed by the air-coating interface be refracted to a plane wavefront at the coating-fiber interface leads to the lower $\theta_A$ disappearance condition $$\frac{r_2}{r_1} = \frac{n_0(n_1 - n_2)}{n_2(n_1 - n_0)} \quad (3)$$

This evaluates to $r_2/r_1 = 0.1045$ for an $n = 1.539$ coating which is the lower $\theta_A$ cutoff point, as seen in FIG. 8. In actual fibers, the presence of a higher-index core will tend to slightly decrease the cutoff ratio below that predicted by Equation (3).

The scattering pattern from the well-centered $n = 1.539$ coating was examined in detail. The fiber was rotated through 360 degrees of azimuth in 10-degree increments, and measurements of the positions of the respective A and B boundaries were made on a screen 47 mm behind the fiber. A statistical summary is given in Table II.

With values of $n_0 = 1.0003$, $n_1 = 1.539$, $n_2 = 1.457$, and $r_2/r_1 = 0.553$, we compared this observed pattern to the theoretically predicted one. They were mutually consistent: The average measured value of the $\theta_A$ was $25.7$ degrees$\pm 2.7$ degrees versus $25.4$ degrees$\pm 1.3$ degrees predicted from the ray trace. For $\theta_B$, we measured $45.7 \pm 3.2$ degrees versus $49.4$ degrees$\pm 2.2$ degrees predicted. The estimated experimental errors reflect both the distribution in measured values from different azimuths and uncertainty in each single measurement. Theoretical uncertainties arose from inexact knowledge of $r_1$ and $r_2$ as obtained from cross sections.

The pattern's high sensitivity coupled with its easy identifiability fill the requirements of a coating geometry monitor very well. A skewed pattern is interpreted as an error signal. Then, by monitoring scatter patterns from two perpendicular directions, one can guide the coating applicator into proper, centered alignment. Continued monitoring and feedback compensate for drifts in the fiber path.

TABLE II

| | Comparison of experimental results with theoretical predictions | | | |
|---|---|---|---|---|
| | A (mm) | $\theta°_A$ | B (mm) | $\theta°_B$ |
| Right side | 22.5 ± 2.9 | 25.6 ± 2.9 | 48.6 ± 5.2 | 45.9 ± 3.1 |
| Left side | 22.6 ± 2.7 | 25.7 ± 2.7 | 47.7 ± 5.6 | 45.4 ± 3.3 |
| Overall | 22.6 ± 2.8 | 25.7 ± 2.7 | 48.1 ± 5.4 | 45.7 ± 3.2 |
| Theoretical | | 25.4 ± 1.3 | | 49.4 ± 2.2 |

Figure 9:
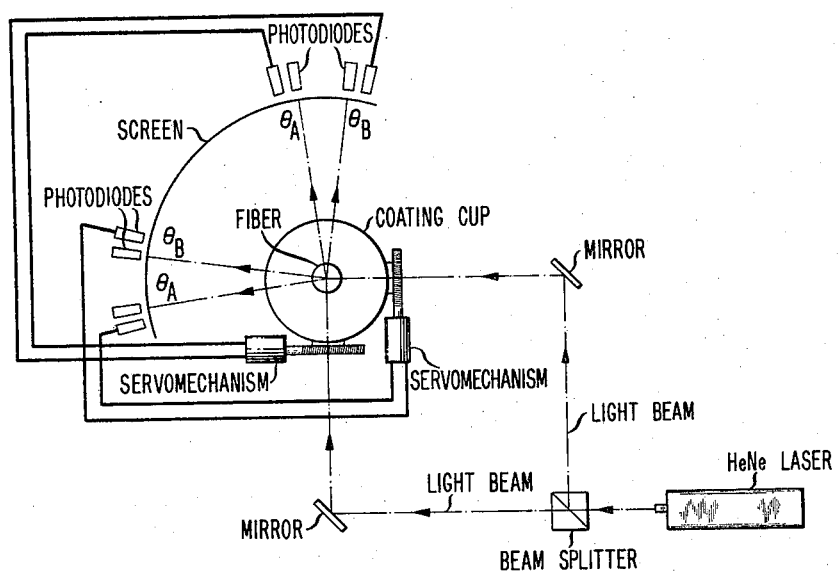
FIG. 9 is a schematic view of a automated manufacturing apparatus for producing concentrically coated fibers.

FIG. 9 shows a crossed beam setup used to obtain the centered $n = 1.539$ coating over a silica (TO8) filament. An $n = 1.49$ coating was also successfully centered, but as the refractive index of the coating approaches the refractive index of the glass, the visibility of the important caustic rays are diminished. In general, a $\Delta n$ of at least 0.02 is preferred from this standpoint.

A similar crossed-beam monitoring setup was then used on another drawing line to monitor and maintain centering on a 6.6-km length of optical waveguide. Table III shows how eccentricity varied with position as measured on cross sections taken later. Overall, we see excellent centricity, but at the 4.4-km position an unexplainable gross eccentricity occurred. It was traced forward and back and found to have started about 250 m before and ended 100 m after the 4.4-km point. There is nothing in the ray trace theory to suggest any ambiguity in the pattern at large eccentricities.

In the past, unpublished data had been taken by the author on the results of using alignment techniques which did not utilize light scattering. The best set of data showed a median eccentricity of 12.9 $\mu$m with other medians from about 15 $\mu$m to 25 $\mu$m. Also, these other techniques could not detect ongoing changes in alignment during the drawing process.

TABLE III

Coating geometry of a 6.6-km optical fiber where forward scattering monitoring was used to control coater alignment. Monitoring and feedback started after the 0-km point. The excursion at 4.4 km remains unexplained. Uncertainty of all cross-section measurements is within ±2 $\mu$m.

| Distance from Start (km) | Coating Eccentricity ($\mu$m) | Glass Diameter ($\mu$m) | Coating Diameter ($\mu$m) |
|---|---|---|---|
| 0.0 | 46.3 | 110.6 | 245.6 |
| 1.1 | 5.0 | 109.3 | 252.4 |
| 2.2 | 7.7 | 108.7 | 260.7 |
| 3.3 | 2.0 | 109.8 | 265.8 |
| 4.4 | 59.5 | 110.6 | 256.8 |
| 5.5 | 8.1 | 110.5 | 268.2 |
| 6.6 | 9.7 | 108.7 | 280.9 |

As I have discussed, a technologically important manufacturing process embodies this technique for applying a concentric coating to a fiber lightguide. The manufacturing process begins with the pulling of a pristine glass fiber. The fiber may be pulled from a variety of well known sources such as a glass preform, made by MCVD, soot, CVD, VAD, or other suitable preform fabrication process, or from a crucible or other suitable glass source. All of these techniques are well known and form no part of this invention. The pristine fiber is then coated, again by any suitable coating technique. Commercially important coating processes generally involve passing the fiber through a reservoir of coating material, typically a cup, and passing the fiber through an exit die in the base of the cup. Other arrangements may be envisioned or devised but the application of the coating per se again forms no part of the invention. It is important to the invention, however, to have the capability of adjusting the coating apparatus to change the concentricity of the coating with respect to the fiber. This adjustment is continuously (or semi-continuously in the sense of periodic sampling of concentricity data, or periodically generating that data, at rates exceeding several samples per minute) made during the manufacture of the coated fiber. The importance of producing concentrically coated fiber has already been mentioned and, recalling that the fiber is manufactured at rates of at least the order of 10–100 meters per minute, the manufacturing process requires real time control in the coating process.

The centering of the fiber within the coating apparatus can be obtained obviously by movement of either the fiber or the coating apparatus. The two alternatives are defined by the phrase "relative movement between the fiber and the coating apparatus". The operative element of the coating apparatus is typically a coating die in the exit region of the coating cup. The die is often referred to as the "exit die". It is usually preferable to move the die rather than the fiber and this is achieved by moving the coating cup using conventional servo techniques. The servo instruments are activated by the caustic ray monitors as shown in FIG. 12. The monitors are conveniently comprised of an array of photodiodes, as suggested by the Figure, or other suitable electronic detectors such as a video camera. The arrangement shown in FIG. 12 is but one of a wide variety of means for effecting automatic adjustment of the coating apparatus in response to electrical data generated by the caustic ray pattern of the forward scattered light from, in this case and in the usual case, a laser. The major caustic rays, at $\theta_A$ and $\theta_B$, are incident on photodiodes as shown. As the position of the major caustic drifts to the left or right, on either beam, the caustic will be sensed by another photodiode which activates the servomotor until light is no longer sensed by that diode.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. Method for the manufacture of coated fiber waveguides comprising the steps of:
    producing a pristine glass fiber,
    passing the fiber through a container of coating material and through an exit die in the container,
    aligning the fiber within the exit die by respective movement between the fiber and the container,
    directing a light beam on the fiber after it exits the exit die, the direction of the light beam at the point of incidence on the fiber being at least approximately transverse to the fiber axis,
    detecting the brightness and/or position of at least one caustic surface produced from the portion of the beam that traverses the region of the interface between the fiber and the coating material and exits the fiber from a point more than 90 degrees removed from the point of incidence of the beam, and
    continuously aligning the fiber, with respect to the exit die, in accordance with the brightness and/or position of the caustic surface detected.

2. The method of claim 1 in which alignment is achieved by moving the container.

3. The method of claim 1 including the additional step of directing a second light beam on the fiber in the same manner as the first light beam but at a point of incidence on the fiber removed from the point of incidence of the first light beam,
    detecting and aligning using said second light beam in the same manner as used with the first light beam.

4. The method of claim 3 in which both light beams are produced from a single laser.

5. Method of claim 1 in which two caustic surfaces are detected.

* * * * *